United States Patent
Miyake

(10) Patent No.: US 12,528,429 B2
(45) Date of Patent: Jan. 20, 2026

(54) ELECTRONIC CONTROL UNIT, VEHICLE CONTROL SYSTEM, AND VEHICLE CONTROL METHOD

(71) Applicant: TOYOTA JIDOSHA KABUSHIKI KAISHA, Toyota (JP)

(72) Inventor: Masaki Miyake, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 246 days.

(21) Appl. No.: 18/206,911

(22) Filed: Jun. 7, 2023

(65) Prior Publication Data

US 2024/0001871 A1  Jan. 4, 2024

(30) Foreign Application Priority Data

Jun. 30, 2022 (JP) ................. 2022-106080

(51) Int. Cl.
*B60R 16/023* (2006.01)
*G06F 8/65* (2018.01)
*G06F 8/71* (2018.01)

(52) U.S. Cl.
CPC ............ *B60R 16/0231* (2013.01); *G06F 8/71* (2013.01); *G06F 8/65* (2013.01)

(58) Field of Classification Search
CPC ....... B60R 16/0231; B60R 16/02; G06F 8/71; G06F 8/65; G06F 9/4401; B60W 50/00; B60W 60/001; B60W 2050/0001
See application file for complete search history.

(56) References Cited

U.S. PATENT DOCUMENTS

| | | | | |
|---|---|---|---|---|
| 12,260,209 | B2* | 3/2025 | Shiohara | G07C 5/008 |
| 2017/0355381 | A1* | 12/2017 | Miloser | G07C 5/008 |
| 2018/0232246 | A1 | 8/2018 | Nakabayashi et al. | |
| 2019/0278582 | A1 | 9/2019 | Miyake et al. | |
| 2020/0249930 | A1* | 8/2020 | Abe | G06F 9/4401 |
| 2021/0200533 | A1* | 7/2021 | Gage | G06F 8/71 |
| 2021/0311721 | A1 | 10/2021 | Miyake et al. | |
| 2022/0148344 | A1 | 5/2022 | Teraoka et al. | |
| 2023/0127886 | A1* | 4/2023 | Bowis | G06F 9/451 717/111 |

FOREIGN PATENT DOCUMENTS

| | | |
|---|---|---|
| JP | 2017-126204 A | 7/2017 |
| JP | 2019-159399 A | 9/2019 |
| JP | 2020-166583 A | 10/2020 |

* cited by examiner

*Primary Examiner* — Wei Y Mui
*Assistant Examiner* — Travis Viet Tran
(74) *Attorney, Agent, or Firm* — Oliff PLC

(57) ABSTRACT

An electronic control unit (ECU), a vehicle control system, and a vehicle control method are provided. The disabling process disables execution of the software stored in storage circuitry when execution circuitry is restarted during operation of the vehicle control system. In a function restricting process, when another ECU is restarted during the operation of the vehicle control system, the software stored in the storage circuitry is executed to enable one of the functions that is capable of being enabled when execution of software in the other ECU is disabled.

5 Claims, 11 Drawing Sheets

Fig.2

| Matching Information | ~51 |
|---|---|
| Master ECU 20 : 12345 | |
| Slave ECU 301 : 23456 | |
| Slave ECU 302 : 34567 | |
| Slave ECU 303 : 45678 | |
| ⋮  ⋮ | |

| Matching Information | ~52 |
|---|---|
| Master ECU 20 : 12346 | |
| Slave ECU 301 : 23457 | |
| Slave ECU 302 : 34568 | |
| Slave ECU 303 : 45679 | |
| ⋮  ⋮ | |

Fig.3

|  | Master ECU 20 | Slave ECU 301 | Slave ECU 302 | Slave ECU 303 | ... |
|---|---|---|---|---|---|
| Function 61 | ○ | ○ | ○ | ○ | |
| Function 62 | ○ | × | ○ | ○ | |
| Function 63 | ○ | ○ | × | ○ | |
| Function 64 | × | ○ | ○ | ○ | |
| ⋮ | | | | | |

(table id ~55)

ELECTRONIC CONTROL UNIT, VEHICLE CONTROL SYSTEM, AND VEHICLE CONTROL METHOD

BACKGROUND

1. Field

The present disclosure relates to an electronic control unit (ECU), a vehicle control system, and a vehicle control method.

2. Description of Related Art

Japanese Laid-Open Patent Publication No. 2019-159399 discloses an example of a vehicle control system that enables functions of a vehicle. The vehicle control system enables the functions of the vehicle by causing each of electronic control units (ECUs) to execute software. The functions are functions that can be enabled by operating vehicle on-board actuators, such as an automatic driving function and an automatic parking function.

One of the ECUs is a master ECU, and the remaining ECUs are slave ECUs. The master ECU stores matching information that indicates a combination of versions of software that enables the functions. When the vehicle control system is started, each of the slave ECUs sends information indicating a version of software executed by the slave ECU to the master ECU.

The master ECU checks the version indicated by the information sent from the slave ECUs against the matching information to determine whether the versions of the software of all the ECUs match each other. When determining that the versions of the software of all the ECUs match each other, the master ECU permits the slave ECUs to execute the software. This allows the vehicle control system to enable the functions of the vehicle.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An aspect of the present disclosure provides a first example of an electronic control unit (ECU). The ECU is one of ECUs are configured to provide a vehicle control system that enables functions of a vehicle. The ECU includes storage circuitry that stores software that enables the functions of the vehicle and execution circuitry that executes the software stored in the storage circuitry. The execution circuitry is configured to execute a disabling process that disables execution of the software stored in the storage circuitry when the execution circuitry is restarted during operation of the vehicle control system. The execution circuitry is configured to execute a function restricting process that executes the software stored in the storage circuitry to enable one of the functions that is capable of being enabled when execution of the software in another ECU is disabled in a case in which the other ECU is restarted during the operation of the vehicle control system.

When the ECU is restarted during the operation of the vehicle control system, the ECU disables the execution of the software stored in the storage circuitry. When another ECU is restarted during the operation of the vehicle control system, the ECU executes the software stored in the storage circuitry of the ECU to enable the function capable of being enabled even if the execution of the software in the other ECU is stopped. Thus, even if the version of software executed by some of the ECUs included in the vehicle control system does not match the version of software executed by the remaining ECUs, some of the functions can be enabled for the vehicle. When an ECU is reset or restarted, the execution circuitry included in the ECU may also be reset or restarted. Thus, when the execution circuitry is reset or restarted, the ECU including the execution circuitry may also be reset or restarted.

During the operation of the vehicle control system, the latest version of software may be installed in ECUs included in the vehicle control system. Even if the software is installed in the ECU during the operation of the vehicle control system, the ECU continues to execute the software of the version being executed. When the latest version of software is installed in the ECU and then the ECU is reset and restarted, the ECU executes the latest version of software.

The ECU in which the latest version of software is installed may be reset during the operation of the vehicle control system. In this case, when the ECU is restarted, the ECU starts executing the latest version of the software. As a result, even if the version of software executed by some of the ECUs included in the vehicle control system may fail to match the version of software executed by the remaining ECUs. In this case, the vehicle control system may fail to enable any one of the functions. The above configuration reduces such a risk.

Another aspect of the present disclosure provides a second example of an ECU. A master ECU includes master storage circuitry that stores software that enables functions of a vehicle and master execution circuitry that executes the software. The master ECU and slave ECUs are included in a vehicle control system that enables the functions of the vehicle. The master ECU is configured to communicate with the slave ECUs. The master execution circuitry is configured to disable execution of the software and send information indicating a master disabled function to each of the slave ECUs when determining that the master execution circuitry is restarted during operation of the vehicle control system. The master disabled function is one of the functions that is capable of being enabled when the execution of the software in the master execution circuitry is disabled.

When determining that the master ECU is restarted during the operation of the vehicle control system, the master ECU disables the execution of the software. The master ECU sends the information at least to the slave ECUs included in the vehicle control system. This allows each of the slave ECUs to execute software so that only some of the functions can be enabled for the vehicle. Some of the functions can be enabled for the vehicle even when the execution of the software in the master ECU is disabled. Thus, even if the version of software executed by some of the ECUs included in the vehicle control system does not match the version of software executed by the remaining ECUs, some of the functions can be enabled for the vehicle.

A further aspect of the present disclosure provides a first example of a vehicle control system. The vehicle control system includes a master device disposed in a vehicle and slave ECUs. The master device is the ECU of the second example. The slave ECUs are the ECUs of the first example.

Yet another aspect of the present disclosure provides a second example of a vehicle control system. The vehicle control system includes a master device disposed in a vehicle and slave ECUs. Thus, the vehicle control system causes the vehicle to enable the functions. The slave ECUs are the ECUs described above. The master device includes master execution circuitry. One of the slave ECUs that was restarted during the operation of the vehicle control system is a restarted slave ECU. The master execution circuitry is configured to send an unauthorized start notification to each of the slave ECUs when receiving information indicating a version of the software from one of the slave ECUs during the operation of the vehicle control system. The unauthorized start notification is information indicating that the one of the slave ECUs that has sent the information indicating the version is the restarted slave ECU.

A still further aspect of the present disclosure provides a vehicle control method. The vehicle control method includes providing a master device and providing slave electronic control units disposed in a vehicle. The slave ECUs are capable of sending and receiving information to and from the master device. The master device and the slave ECUs enable functions of the vehicle. Each of the slave ECUs includes storage circuitry that stores software that enables the functions of the vehicle. The vehicle control method includes causing the slave ECU to send information indicating a version of the software stored in the storage circuitry of the slave ECU to the master device when the slave ECU is started. The restarted slave ECU is one of the slave ECUs that was restarted during operation of the system including the slave ECUs. The vehicle control method includes causing the master device to send an unauthorized start notification to each of the slave ECUs when the master device receives information indicating the version of the software from one of the slave ECUs during operation of the vehicle control system. The unauthorized start notification is information indicating that the slave ECU that has sent the information indicating the version is a restarted slave ECU. The restarted slave ECU is one of the slave ECUs that was restarted during the operation of the vehicle control system including the slave ECUs. The vehicle control method includes causing the restarted slave ECU to disable execution of the software stored in the storage circuitry of the restarted slave ECU. The vehicle control method includes causing another one of the slave ECUs other than the restarted slave ECU to execute the software stored in the storage circuitry of the other one of the slave ECUs to enable one of the functions that is capable of being enabled when the execution of the software is disabled in the restarted slave ECU.

In the vehicle control method, when a slave ECU is restarted during the operation of the vehicle control system, that slave ECU sends the version of the software stored in the storage circuitry of that slave ECU to the master device. When the master device receives the information indicating the version from any one of the slave ECUs, the master device sends, to the slave ECUs, information indicating that the slave ECU that has sent the information indicating the version is the restarted slave ECU. Then, the restarted slave ECU disables the execution of the software. The other slave ECU other than the restarted slave ECU executes the software stored in the storage circuitry of the other slave ECU to enable one of the functions that is capable of being enabled even when the execution of the software in the restarted slave ECU is disabled. Thus, even if the version of software executed by some of the slave ECUs does not match the version of software executed by the remaining slave ECUs, some of the functions can be enabled for the vehicle.

Other features and aspects will be apparent from the following detailed description, the drawings, and the claims.

BRIEF DESCRIPTION OF DRAWINGS

FIG. 2 is a diagram showing the matching information stored in the master ECU of the vehicle control system of FIG. 1.

FIG. 3 is a diagram showing a combination table stored in the ECUs included in the vehicle control system of FIG. 1.

Other features and aspects will be apparent from the following detailed description, the drawings, and the claims.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

First Embodiment

A first embodiment will now be described with reference to FIGS. 1 to 9.

Figure 1:
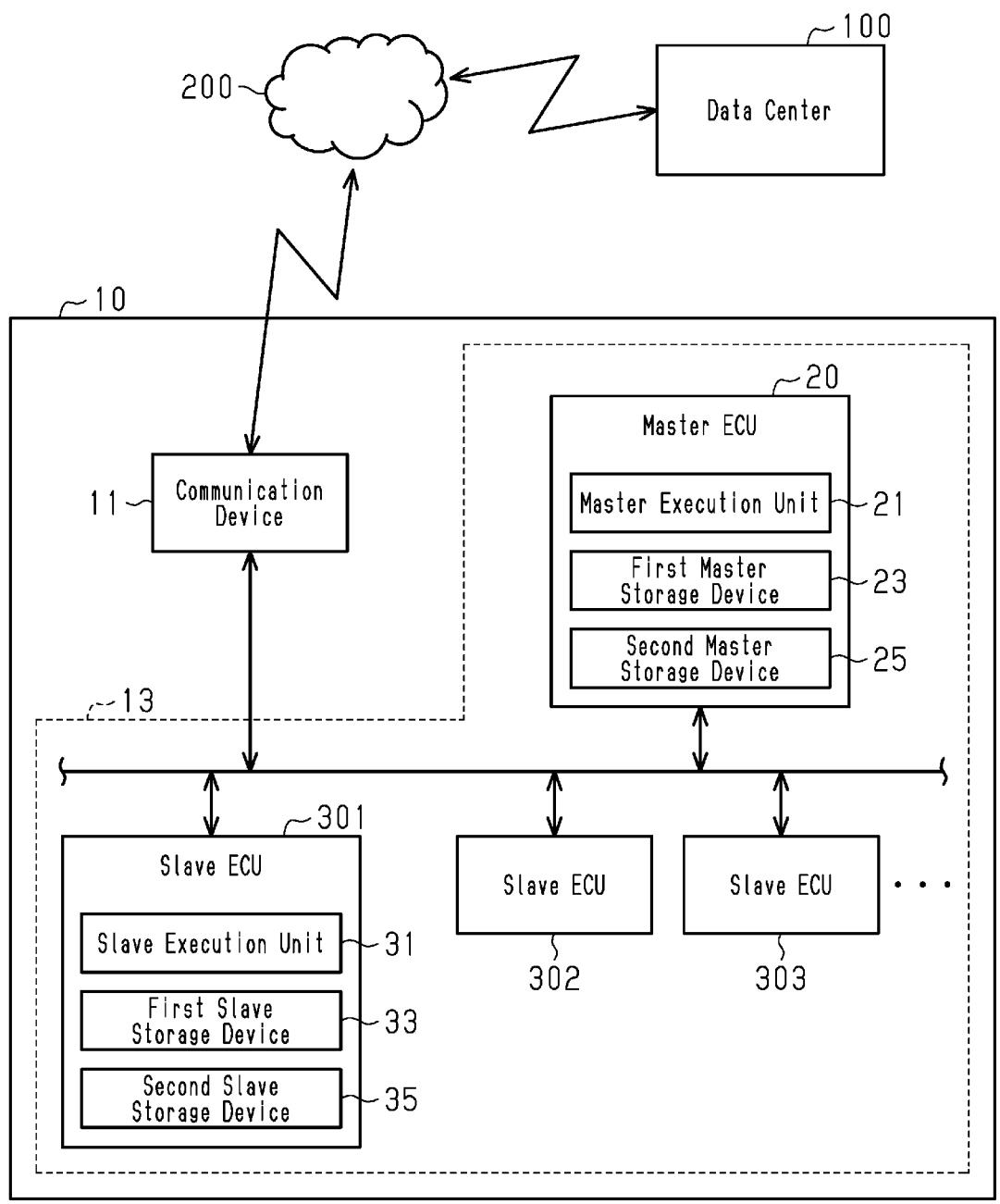
FIG. 1 is a diagram showing a schematic configuration of a vehicle including a vehicle control system and a schematic configuration of a data center configured to communicate with the vehicle in a first embodiment of the present disclosure.

FIG. 1 shows a vehicle 10 and a data center 100 that communicates with the vehicle 10. The data center 100 is disposed outside the vehicle 10.

Vehicle

As shown in FIG. 1, the vehicle 10 includes a communication device 11 and a vehicle control system 13. The communication device 11 communicates with the data center 100 via a global network 200. The communication device 11 sends, to the vehicle control system 13, information received from the data center 100. Further, the communication device 11 sends, to the data center 100, the information sent from the vehicle control system 13.

The vehicle control system 13 is configured to enable functions of the vehicle 10. The functions are used to improve the convenience for a driver when the vehicle control system 13 causes the vehicle 10 to travel. Such functions include, for example, an automated driving function, an automated parking function, lane keeping assist, and adaptive cruise control.

The vehicle control system 13 includes electronic control units (ECUs). That is, the vehicle 10 is provided with a plurality of ECUs that can constitute the vehicle control system 13. The vehicle control system 13 includes, as the ECUs, one master ECU 20 and slave ECUs (301, 302, 303, ...).

The ECUs (20, 301 to 303, ...) are configured to send and receive various types of information to and from each other. In the present embodiment, the master ECU 20 corresponds to a master device.

The master ECU 20 includes a master execution unit 21, a first master storage device 23, and a second master storage device 25. For example, the master execution unit 21 is a CPU. The first master storage device 23 stores various control programs that are executed by the master execution unit 21. The first master storage device 23 stores a first master software and a second master software as control programs. The first master software is used to enable the functions of the vehicle 10. The second master software is used to enable control that is executed by the master ECU 20 alone. In the present embodiment, the first master storage device 23 stores versions of software as the first master software. Specifically, the first master storage device 23 stores the latest version of the first master software and the previous version of the first master software, which is one version before the latest version. That is, the first master storage device 23 is storage circuitry configured to store multiple versions of the first master software. The master execution unit 21 may be master execution circuitry.

The second master storage device 25 stores matching information and a combination table. The matching information and the combination table will be described later. Each of the first master storage device 23 and the second master storage device 25 may be master storage circuitry.

At least one of the slave ECUs (the slave Electronic Control Units 301 to 303, ...) is a control device that controls a vehicle on-board device. Examples of the vehicle on-board device include a driving device, a braking device, and a steering device.

Each of the slave ECUs (301 to 303, ...) includes a slave execution unit 31, a first slave storage device 33, and a second slave storage device 35. For example, the slave execution unit 31 is a CPU. The first slave storage device 33 stores a first slave software and a second slave software as control programs. The first slave software is used to enable the functions of the vehicle 10. The second slave software is used to enable control that is executed by the slave ECU alone. In the present embodiment, the first slave storage device 33 stores versions of software as the first slave software. Specifically, the first slave storage device 33 stores the latest version of the first slave software and an older version of the first slave software. That is, the first slave storage device 33 is storage circuitry configured to store multiple versions of the first slave software. The slave execution unit 31 may be slave execution circuitry.

The second slave storage device 35 stores the combination table. The combination table stored in the second slave storage device 35 is the same as the combination table stored in the second master storage device 25.

In the present embodiment, the first slave storage device 33 corresponds to first storage circuitry that stores the first slave software. The second slave storage device 35 corresponds to second storage circuitry. Each of the first slave storage device 33 and the second slave storage device 35 may be slave storage circuitry.

The matching information will now be described with reference to FIG. 2.

The matching information indicates a combination of versions of software that enable all the functions of the vehicle 10. Of the two types of matching information shown in FIG. 2, first matching information 51 is used when the version of the first master software is, for example, 12345. Of the two types of matching information shown in FIG. 2, second matching information 52 is used when the version of the first master software is, for example, 12346.

The combination table 55 will now be described with reference to FIG. 3.

The combination table 55 indicates a combination of ECUs required for function enablement in each of functions 61, 62, 63, 64, .... That is, the storage device that stores the combination table 55 stores the type of ECU required to execute a first function of the functions 61 to 64, ..., and the type of ECU required to execute a second function of the functions 61 to 64, ....

According to the combination table 55, when the following requirements (A11) and (A12) are satisfied, the functions 61 can be enabled for the vehicle 10.

(A11) The first master software is executed in the master ECU 20.

(A12) In all the slave ECUs (301 to 303, ...), the first slave software stored in the first slave storage device 33 of each slave ECU (301 to 303, ...) is executed.

According to the combination table 55, when the following requirements (A21) and (A22) are satisfied, the functions 62 can be enabled for the vehicle 10.

(A21) The first master software is executed in the master ECU 20.

(A22) Of the slave ECUs (301 to 303, ...), in the slave ECUs (302, 303, ...) other than the first slave ECU 301, the first slave software stored in the first slave storage device 33 of each slave ECU (302, 303, ...) is executed.

According to the combination table 55, when the following requirements (A31) and (A32) are satisfied, the functions 63 can be enabled for the vehicle 10.

(A31) The first master software is executed in the master ECU 20.

(A32) Of the slave ECUs (301 to 303, . . . ), in the slave ECUs (301, 303, . . . ) other than the second slave ECU 302, the first slave software stored in the first slave storage device 33 of each slave ECU (301, 303, . . . ) is executed.

According to the combination table 55, when the following requirement (A4) is satisfied, the functions 64 can be enabled for the vehicle 10.

(A4) In all the slave ECUs (301 to 303, . . . ), the first slave software stored in the first slave storage device 33 of each slave ECU (301 to 303, . . . ) is executed.

Data Center

As shown in FIG. 1, the data center 100 manages the software executed in the ECUs 20, 301 to 303, . . . of the vehicle 10. For example, when the ECUs 20, 301 to 303, . . . include an ECU having software that needs to be updated, the data center 100 sends the latest version of the software to the vehicle 10 via the global network 200 so that the latest version of the software to the vehicle 10 is installed in the ECU that needs to be updated. For example, when updating the first master software in the master ECU 20, the data center 100 also sends the matching information for the latest version of the first master software to the vehicle 10 via the global network 200.

The flow of processes that update the first master software of the master ECU 20 will now be described. In this case, the data center 100 sends the latest version of the first master software to the vehicle 10 via the global network 200. In the vehicle 10, the communication device 11 receives the latest version of the first master software. Multiple versions of the first master software are stored in the first master storage device 23 of the master ECU 20. Thus, in the master ECU 20, the oldest version of the master slave software is deleted from the versions of the first master software, and then the first master software of the latest version received by the communication device 11 is written in the first master storage device 23. Further, in the master ECU 20, the matching information for the latest version of the first slave software is written in the second master storage device 25.

The flow of processes that update the first slave software of the slave ECUs (301 to 303, . . . ) is the same as the flow of processes that update the first master software, and thus will not be described.

Vehicle Control Method

The flow of processes that reset the first slave ECU 301 and then restart the first slave ECU 301 during the operation of the vehicle control system 13 will now be described with reference to FIG. 4. To facilitate understanding, the vehicle control system 13 includes two slave ECUs; namely, the first slave ECU 301 and the second slave ECU 302.

When an operation switch of the vehicle 10 is operated to start the vehicle control system 13, the first and second slave ECUs 301, 302 respectively send, to the master ECU 20, information indicating the version of the first slave software that is the latest version stored in each of the first and second slave ECUs 301, 302 (steps S11 and S13). Specifically, each of the first and second slave ECUs 301, 302 periodically sends the information indicating the version to the master ECU 20.

When receiving the information indicating the version from the first and second slave ECUs 301, 302, the master ECU 20 checks the version of the software used to enable the functions (step S15). The master ECU 20 uses the matching information corresponding to the latest version of the first master software stored in the master ECU 20. Based on the matching information, the master ECU 20 determines whether the version of the first master software, the version of the first slave software of the first slave ECU 301, and the version of the first slave software of the second slave ECU 302 match each other. The master ECU 20 sends a start command corresponding to the determination result to each of the first and second slave ECUs 301, 302. Specifically, when determining that the versions of the software match each other, the master ECU 20 sends, to each of the first and second slave ECUs 301, 302, the start command indicating that the first slave software is permitted to be executed; namely, a first start command. When determining that the versions of the software do not match each other, the master ECU 20 sends, to each of the and second slave ECUs 301, 302, the start command indicating that the first slave software is not permitted to be executed; namely, a second start command.

When receiving the first or second start command from the master ECU 20, each of the first and second slave ECUs 301, 302 stops sending the information indicating the version (steps S17, S19). Then, the first and second slave ECUs 301, 302 start slave software stored therein (steps S21 and S23). Specifically, when receiving the first start command indicating that the first slave software is permitted to be executed, the first and second slave ECUs 301, 302 start executing the first slave software and the second slave software, respectively. When receiving the first start command indicating that the first slave software is not permitted to be executed, each of the first and second slave ECUs 301, 302 starts executing the second slave software of the first slave software and the second slave software.

When sending the first or second start command, the master ECU 20 starts the master software (step S25). Specifically, when sending the first start command indicating that the first slave software is permitted to be executed, the master ECU 20 starts executing the first master software and the second master software. When sending the first start command indicating that the first slave software is not permitted to be executed, the master ECU 20 starts executing the second one of the first slave software and the second slave software.

When the master ECU 20 executes the first master software and each of the first and second slave ECUs 301, 302 executes the first slave software, all of the functions are enabled for the vehicle 10. When the master ECU 20 does not execute the first master software and each of the first and second slave ECUs 301, 302 does not execute the first slave software, none of the functions are enabled for the vehicle 10. However, the master ECU 20 executes the second master software and is thus capable of executing control that can be executed by the master ECU 20 alone. Similarly, the first and second slave ECUs 301, 302 execute the second slave software stored therein and are thus capable of executing control that can be executed by the first and second slave ECUs 301, 302 alone.

When the first slave ECU 301 is reset during the operation of the vehicle control system 13 in this manner, the first slave ECU 301 is restarted. Thus, the first slave ECU 301 sends, to the master ECU 20, information indicating the version of the first slave software that is the latest version stored in the first slave ECU 301 (step S27). That is, only one of the first and second slave ECUs 301, 302 that was restarted during the operation of the vehicle control system 13 starts sending the information indicating the version.

When receiving the information indicating the version of the first slave software from one of the first and second slave ECUs 301, 302, the master ECU 20 identifies the slave ECU that has sent the information as a restarted slave ECU (step S29). In this case, the master ECU 20 identifies the first slave ECU 301 as the restarted slave ECU. Then, the master ECU 20 sends, to each of the first and second slave ECUs 301, 302, an unauthorized start notification that is information indicating that the first slave ECU 301 is the restarted slave ECU.

When receiving the unauthorized start notification, the first slave ECU 301 stops sending the information indicating the version (step S31). Then, the first slave ECU 301 disables the execution of the first slave software (step S33).

When receiving the unauthorized start notification, the second slave ECU 302 executes the first slave software stored therein to enable only some of the functions (step S35). Specifically, when receiving the unauthorized start notification, the second slave ECU 302 can recognize that the first slave ECU is the restarted slave ECU. Based on the combination table 55, the second slave ECU 302 recognizes one of the functions that is capable of being enabled without the first slave ECU 301 executing the first slave software. The second slave ECU 302 executes the first slave software stored therein to enable only that function. The second slave ECU 302 continues executing the version of the first slave software that was executed before receipt of the unauthorized start notification.

When sending the unauthorized start notification, the master ECU 20 executes the first master software so that only some of the functions can be enabled (step S37). Specifically, based on the combination table 55, the second slave ECU 302 recognizes one of the functions that is capable of being enabled without the first slave ECU 301 executing the first slave software. Then, the master ECU 20 executes the first master software to enable only that function. The master ECU 20 continues executing the version of the first master software that was executed before sending the unauthorized start notification.

Processing Routines Executed by Master ECU

Figure 4:
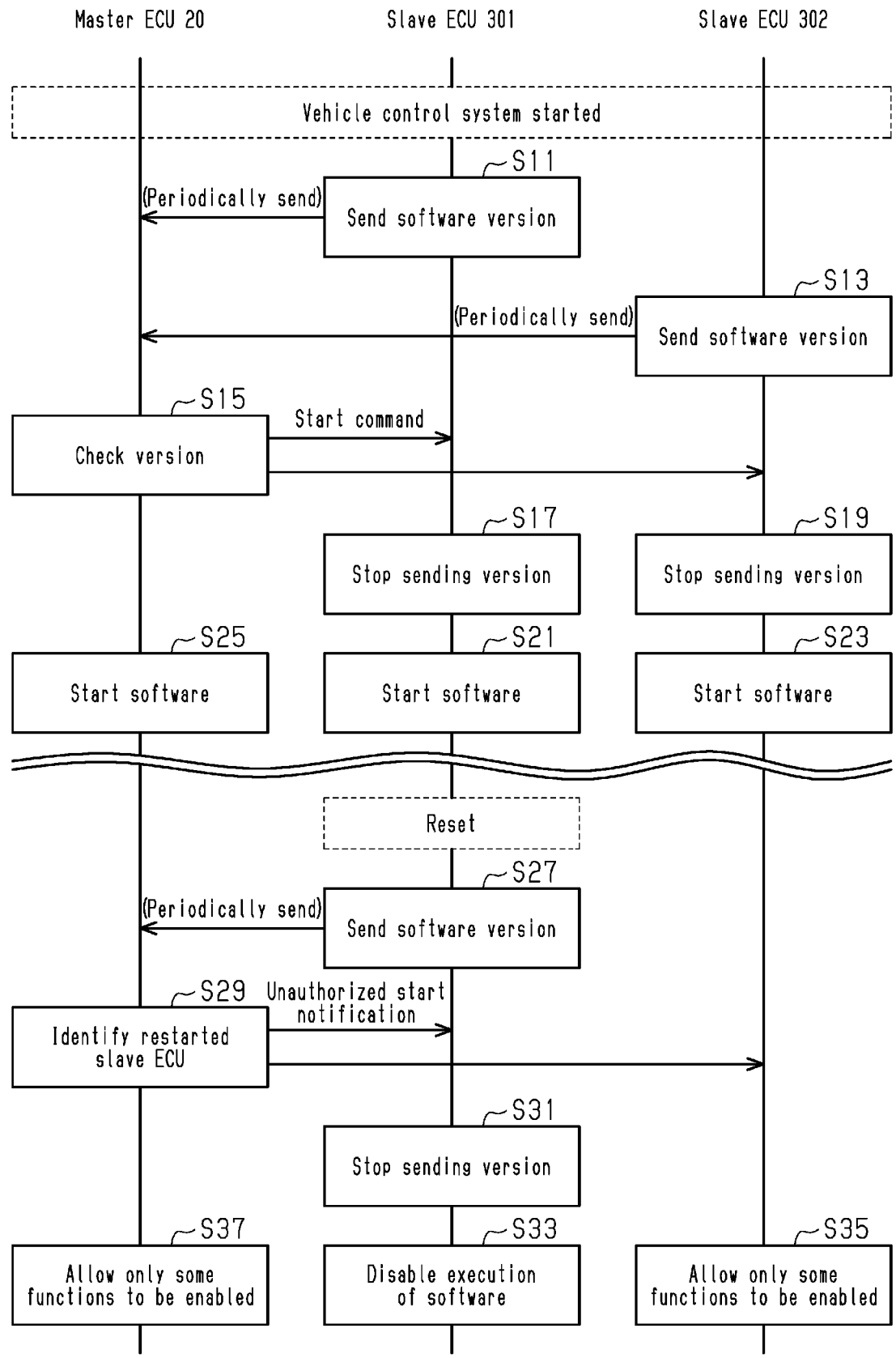
FIG. 4 is a sequence diagram illustrating the flow of a series of processes in the vehicle control system of FIG. 1.
Figure 5:
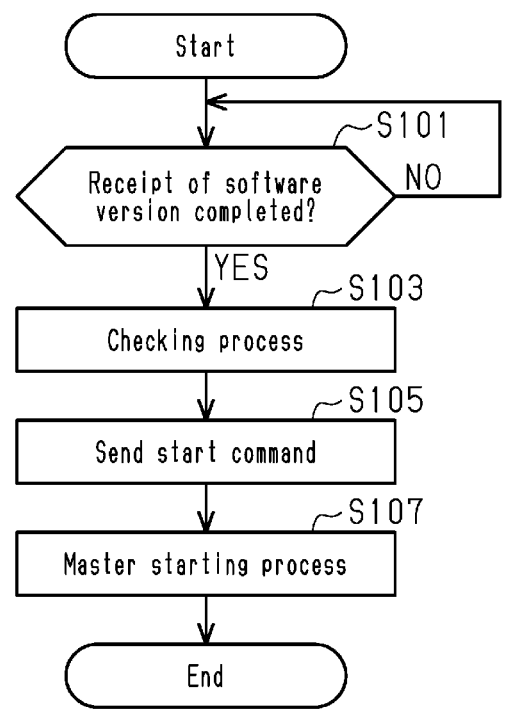
FIG. 5 is a flowchart illustrating a processing routine executed by the master ECU of the vehicle control system shown in FIG. 4.
Figure 6:
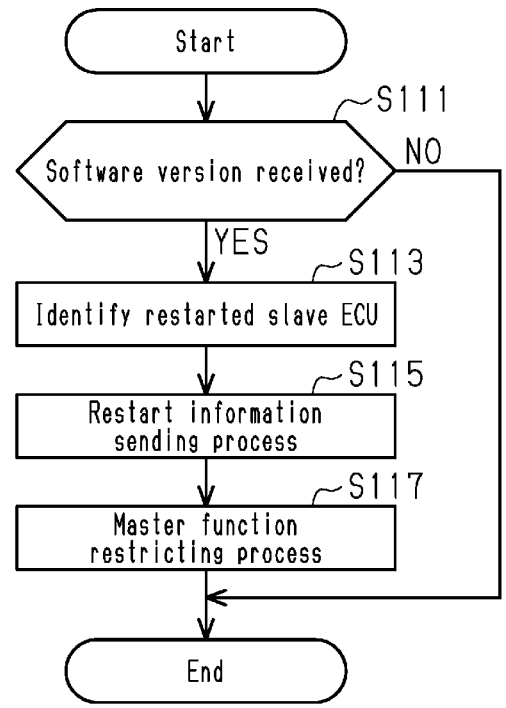
FIG. 6 is a flowchart illustrating a processing routine executed by the master ECU of FIG. 4, subsequent to FIG. 5.
Figure 7:
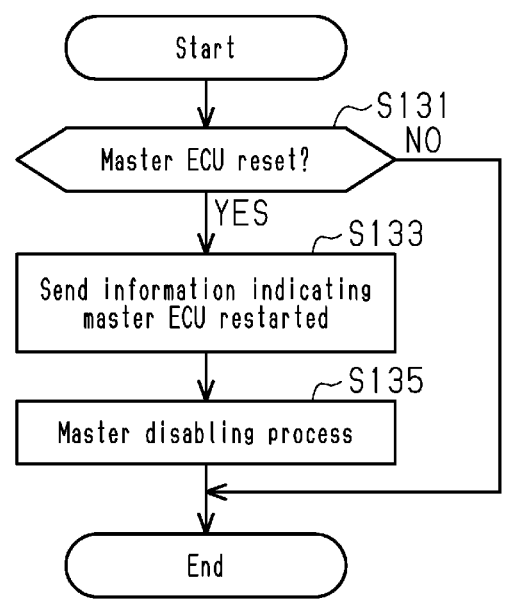
FIG. 7 is a flowchart illustrating a processing routine executed by the master ECU, subsequent to FIG. 5 and separate from FIGS. 4 and 6.

Processing routines executed by the master execution unit 21 of the master ECU 20 to enable the flow of processes as shown in FIG. 4 will now be described with reference to FIGS. 5 to 7.

First, a processing routine executed by the master execution unit 21 when the vehicle control system 13 is started will be described with reference to FIG. 5.

In step S101 of the processing routine, the master execution unit 21 determines whether receipt of the information indicating the version of the first slave software sent from the slave ECUs (301 to 303, . . . ) is completed. When the receipt of the information is completed (S101: YES), the master execution unit 21 advances the process to step S103. When the receipt of the information is not completed (S101: NO), the master execution unit 21 repeatedly executes the determination of step S101 until the receipt of the information is completed.

In step S103, the master execution unit 21 executes a checking process to perform the version check of step S15. Specifically, the master execution unit 21 reads the matching information corresponding to the latest version of the first master software stored therein. Then, based on the matching information, the master execution unit 21 checks whether all the versions of the first slave software executed by the slave ECUs (301 to 303, . . . ) match the version of the first master software.

In step S105, the master execution unit 21 sends the start command corresponding to the execution result of the checking process to the slave ECUs (301 to 303, . . . ). In step S107, the master execution unit 21 executes a master start process that starts execution of the master software as described in step S25. Then, the master execution unit 21 terminates the processing routine.

One of the processing routines executed by the master execution unit 21 upon completion of the processing routine of FIG. 5 will now be described with reference to FIG. 6. The master execution unit 21 repeatedly executes the processing routine in a predetermined control cycle.

In step S111 of the processing routine, the master execution unit 21 determines whether information indicating the version of the first slave software has been received from one of the slave ECUs (301 to 303, . . . ). That is, the master execution unit 21 determines whether information indicating the version has been received from one of the slave ECUs (301 to 303, . . . ) during the operation of the vehicle control system 13. In a case in which the information has been received (S111: YES), the master execution unit 21 advances the process to step S113. In a case in which the information has not been received (S111: NO), the master execution unit 21 temporarily ends the processing routine.

In step S113, as described in step S29, the master execution unit 21 identifies the slave ECU that has sent the information as the restarted slave ECU. In step S115, the master execution unit 21 executes a restart information sending process that sends, to each of the slave ECUs (301 to 303, . . . ) as the unauthorized start notification, the information indicating that the slave ECU that has sent the information is the restarted slave ECU.

In step S117, as described in step S37, the master execution unit 21 executes a master function restricting process that executes the first master software so that only some of the functions 61 to 64, . . . can be enabled. Some of the functions 61 to 64, . . . , can be enabled even if the first slave software is not executed in the restarted slave ECU or the identified slave ECU. Then, the master execution unit 21 temporarily ends the processing routine.

One of the processing routines executed by the master execution unit 21 upon completion of the processing routine of FIG. 5 will now be described with reference to FIG. 7. The master execution unit 21 repeatedly executes the processing routine in a predetermined control cycle.

In step S131 of the processing routine, the master execution unit 21 determines whether the master ECU 20 has been reset during the operation of the vehicle control system 13. When the master ECU 20 is started, the master execution unit 21 waits for the information indicating the version of the first slave software to be sent from the slave ECUs (301 to 303, . . . ). In a case in which only the master ECU 20 of the ECUs 20, 301 to 303, . . . is reset and then restarted during the operation of the vehicle control system 13, the information is not sent from any of the slave ECUs (301 to 303, . . . ) to the master ECU 20. Thus, in a case in which the information is not sent from any slave ECU even when a predetermined time elapses after the start of the master execution unit 211, the master execution unit 21 determines that the master ECU 20 has been reset during the operation of the vehicle control system 13. When determining that the master ECU 20 has been reset during the operation of the vehicle control system 13 (S131: YES), the master execution unit 21 advances the process to step S133. When determining that the master ECU 20 has not been reset during the operation of the vehicle control system 13 (S131: NO), the master execution unit 21 temporarily ends the processing routine.

In step S133, the master execution unit 21 sends, to the slave ECUs (301 to 303, . . . ), information indicating that the master ECU 20 has been restarted during the operation of the vehicle control system 13. In step S135, the master execution unit 21 executes a master disabling process that disables the execution of the first master software. Then, the master execution unit 21 temporarily ends the processing routine.

Processing Routine Executed by Slave ECUs

Figure 8:
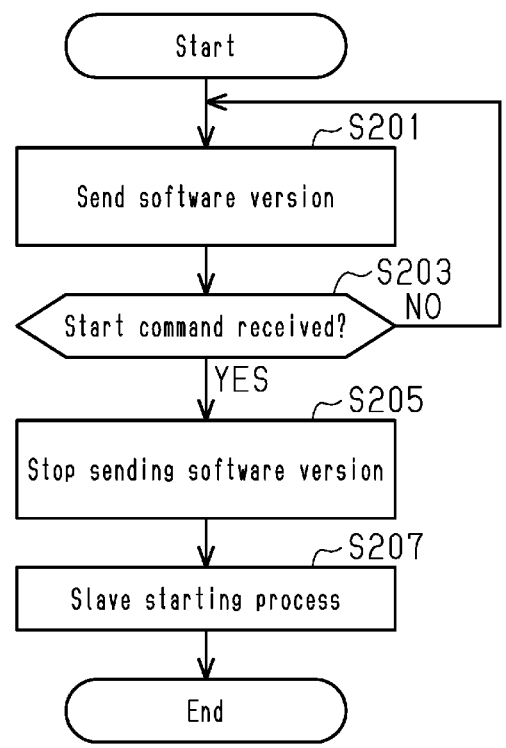
FIG. 8 is a flowchart illustrating a processing routine executed by the slave ECUs of the vehicle control system shown in FIG. 4.
Figure 9:
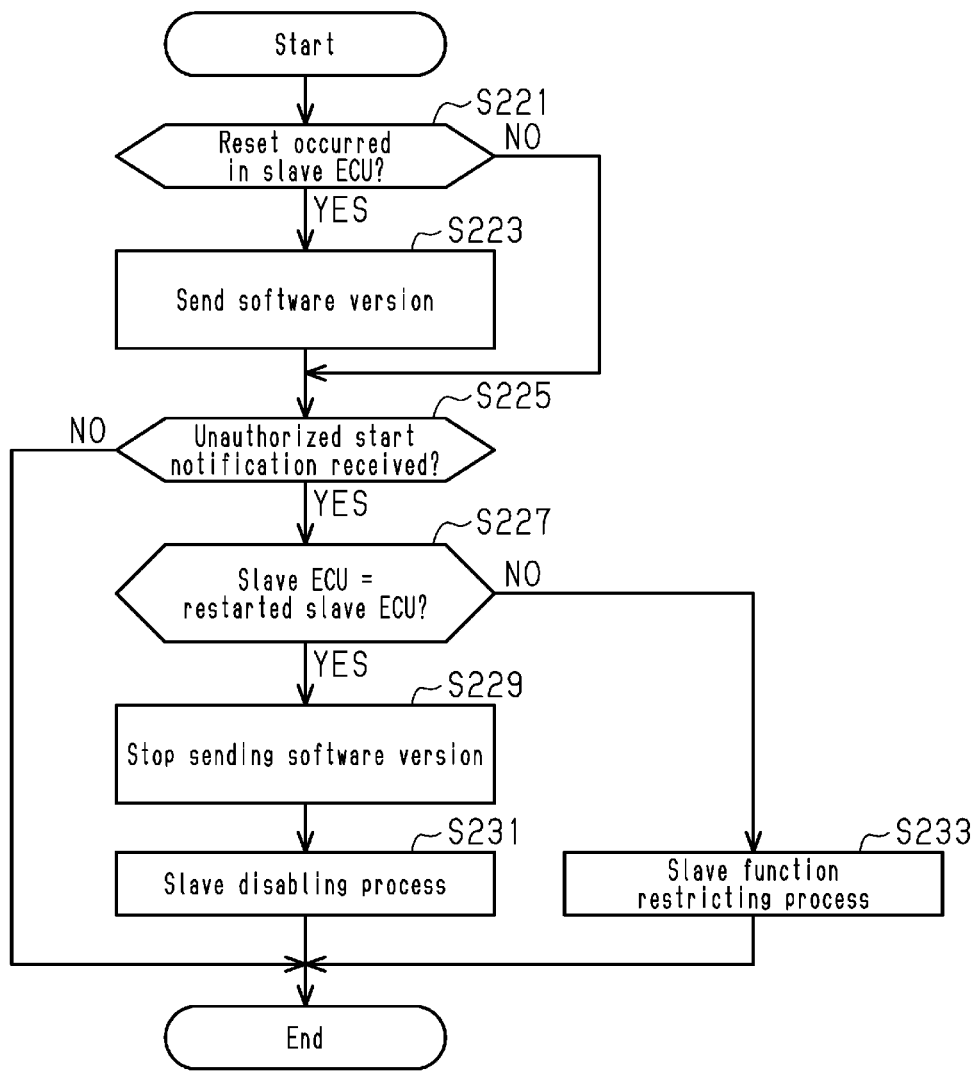
FIG. 9 is a flowchart illustrating a processing routine executed by the slave ECUs of FIG. 4, subsequent to FIG. 8.

Processing routines executed by the master execution units 31 of the slave ECUs (301 to 303, . . . ) to enable the flow of processes as shown in FIG. 4 will now be described with reference to FIGS. 8 and 9.

First, a processing routine executed by each slave execution unit 31 when the vehicle control system 13 is started will be described with reference to FIG. 8.

In step S201 of this processing routine, as described in steps S11 and S13, the slave execution unit 31 sends, to the master ECU 20, information indicating the version of the first slave software that is the latest version stored in the slave ECU. In the present embodiment, step S201 corresponds to a version sending process.

In step S203, the slave execution unit 31 determines whether the slave execution unit 31 has received a start command from the master ECU 20. In a case in which the start command has been received (S203: YES), the slave execution unit 31 advances the process to step S205. In a case in which the start command has not been received (S203: NO), the slave execution unit 31 returns the process to step S201. That is, the slave execution unit 31 repeatedly sends the information indicating the version until receipt of the start command.

In step S205, the slave execution unit 31 stops sending the information indicating the version. In step S207, as described in steps S21 and S23, the slave execution unit 31 executes a slave start process that starts executing the slave software stored in the slave ECU based on the received start command. Then, the slave execution unit 31 terminates the processing routine.

The processing routine executed by the slave execution unit 31 upon completion of the processing routine of FIG. 8 will now be described with reference to FIG. 9. The slave execution unit 31 repeatedly executes the processing routine in a predetermined control cycle.

In step S221 of the processing routine, the slave execution unit 31 determines whether a reset has occurred in the slave ECU. In a case in which a reset has occurred in the slave ECU (S221: YES), the slave execution unit 31 advances the process to step S223. In a case in which a reset has not occurred in the slave ECU (S221: NO), the slave execution unit 31 advances the process to step S225.

In step S223 of this processing routine, as described in step S27, the slave execution unit 31 sends, to the master ECU 20, the information indicating the version of the first slave software that is the latest version stored in the slave ECU. Then, the slave execution unit 31 advances the process to step S225.

In step S225, the slave execution unit 31 determines whether the slave execution unit 31 has received an unauthorized start notification from the master ECU 20. In a case in which the unauthorized start notification has been received (step S225: YES), the slave execution unit 31 advances the process to step S227. In a case in which the unauthorized start notification has not been received (step S225: NO), the slave execution unit 31 temporarily ends the processing routine.

In step S227, the slave execution unit 31 determines whether the slave ECU is a restarted slave ECU based on the unauthorized start notification. When determining that the slave ECU is the restarted slave ECU (S227: YES), the slave execution unit 31 advances the process to step S229. When determining that the slave ECU is not the restarted slave ECU (S227: NO), the slave execution unit 31 advances the process to step S233. That is, when another slave ECU other than the slave ECU of the slave execution unit 31 is the restarted slave ECU, the slave execution unit 31 advances the process to step S233.

In step S229, the slave execution unit 31 stops sending the information indicating the version. In step S231, as described in step S33, the slave execution unit 31 executes a slave disabling process that disables the execution of the first slave software. Then, the slave execution unit 31 temporarily ends the processing routine. In this case, the slave execution unit 31 keeps the execution of the first slave software disabled during the current operation of the vehicle control system 13.

In step S233, as described in step S35, the slave execution unit 31 executes a slave function restricting process that executes the first slave software so that only some of the functions 61 to 64, . . . can be enabled. Some of the functions 61 to 64, . . . , can be enabled for the vehicle 10 even if the first slave software is not executed in the restarted slave ECU. Then, the slave execution unit 31 temporarily ends the present processing routine.

Operation and Advantages of Present Embodiment

During the operation of the vehicle control system 13, the latest version of the first slave software may be installed in at least one of the slave ECUs (301 to 303, . . . ). In this case, in that slave ECU, the latest version of the installed first slave software is not executed, and the execution of an older version of the first slave software is continued.

In such a situation, the slave ECU in which the latest version of the first slave software is installed may be reset and then restarted. In this case, in order to start executing the latest version of the first slave software, the slave ECU sends the information indicating the version of the first slave software that is the latest version to the master ECU 20.

When receiving the information indicating the version of the first slave software during the operation of the vehicle control system 13, the master ECU 20 identifies the slave ECU that has sent the information as the restarted slave ECU. Then, the master ECU 20 sends the unauthorized start notification to the slave ECUs (301 to 303, . . . ).

When receiving the unauthorized start notification, the slave ECU identified as the restarted slave ECU disables execution of the first slave software. The other slave ECUs recognize which slave ECU is the restarted slave ECU based on the unauthorized start notification. Then, by referring to the combination table 55, the other slave ECUs and the master ECU 20 recognize one of the functions 61 to 64, . . . that is capable of being enabled even when the execution of the first slave software is disabled in the restarted slave ECU. For example, when the first slave ECU 301 is the restarted slave ECU, one of the functions 61 to 64, . . . other than the function 63 can be enabled. The other slave ECUs execute the first slave software stored therein to enable the one of the functions 61 to 64, . . . other than the function 63, . . . . Further, the master ECU 20 executes the first master software to enable the one of the functions 61 to 64, . . . other than the function 63.

Thus, even when the version of the first slave software executed by some of the slave ECUs (301 to 303, . . . ) does not match the version of the first slave software executed by the remaining slave ECUs, some of the functions 61 to 64, . . . can be enabled for the vehicle 10.

The present embodiment further achieves the following advantages.

(1-1) When the first slave ECU 301 is restarted during the operation of the vehicle control system 13, the first slave ECU 301 sends information indicating the version of the first slave software that is the latest version stored in the first slave ECU 301 to the master ECU 20. When receiving the information indicating the version from the first slave ECU 301 during the operation of the vehicle control system 13, the master ECU 20 sends the unauthorized start notification indicating that the first slave ECU 301 is the restarted slave ECU to each of the slave ECUs (301 to 303, . . . ). This allows each of the slave ECUs (301 to 303, . . . ) to identify which slave ECU is the restarted slave ECU.

(1-2) Each of the slave ECUs (301 to 303, . . . ) stores the combination table 55 shown in FIG. 3. Thus, each of the slave ECUs (301 to 303, . . . ) receives the unauthorized start notification from the master ECU 20, and thus can recognize a disabled function that cannot be enabled for the vehicle 10 from the functions 61 to 64. Thus, the master ECU 20 does not need to send the information indicating the disabled function and the unauthorized start notification to each of the slave ECUs (301 to 303, . . . ). Accordingly, an increase in the amount of information sent from the master ECU 20 to the slave ECUs (301 to 303, . . . ) is limited.

(1-3) The master ECU 20 may be restarted during the operation of the vehicle control system 13. In this case, the slave ECUs (301 to 303, . . . ) each execute the first slave software to enable, for the vehicle 10, one of the functions 61 to 64, . . . that is capable of being enabled even if the first master software is not executed in the master ECU 20. Thus, even when the version of the first master software executed in the master ECU 20 does not match the version of the first slave software executed in the slave ECUs (301 to 303, . . . ), some of the functions are enabled for the vehicle 10.

Figure 10:
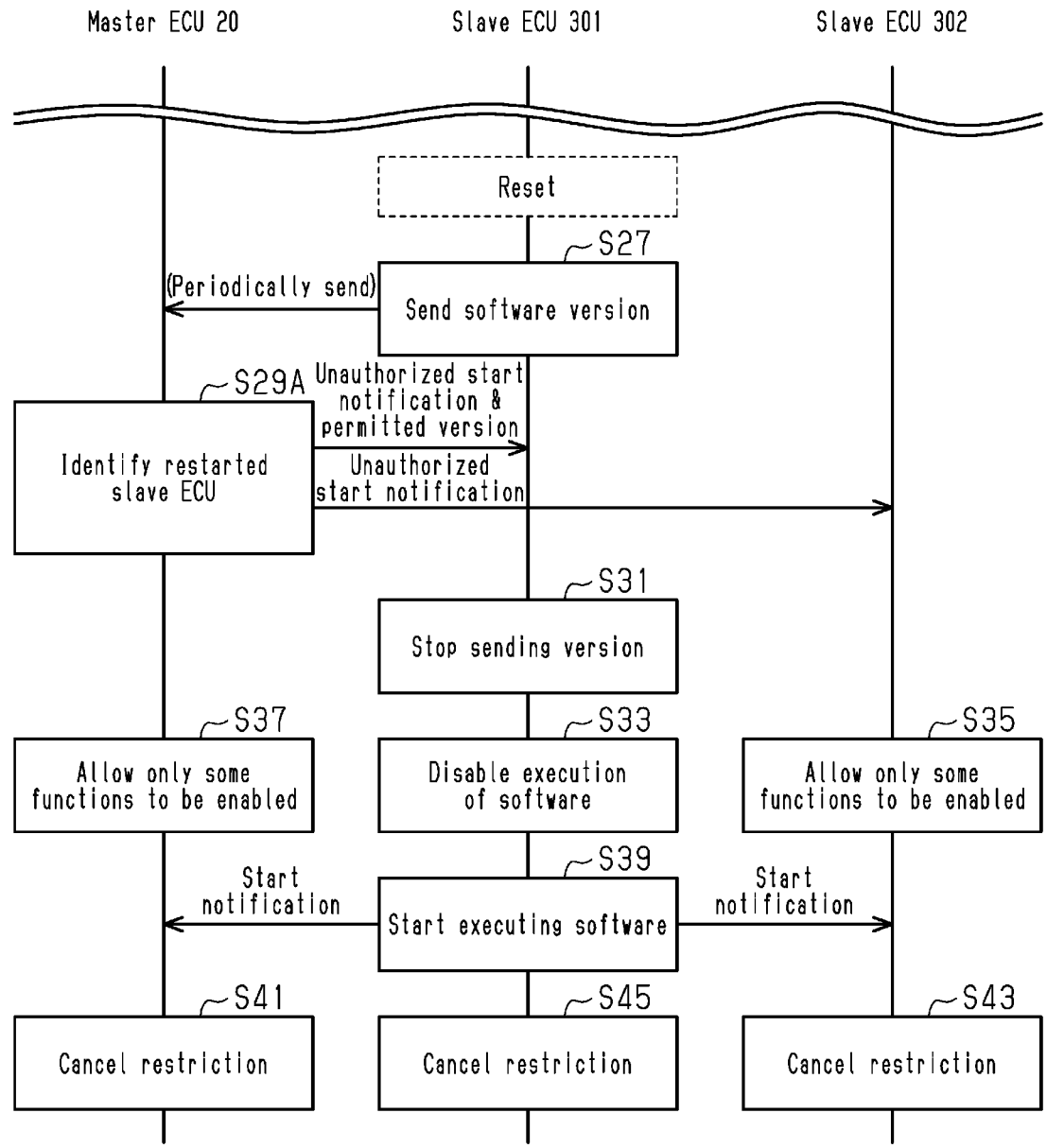
FIG. 10 is a sequence diagram illustrating part of the flow of a series of processes in the vehicle control system according to a second embodiment, which are changed from FIG. 4.
Figure 11:
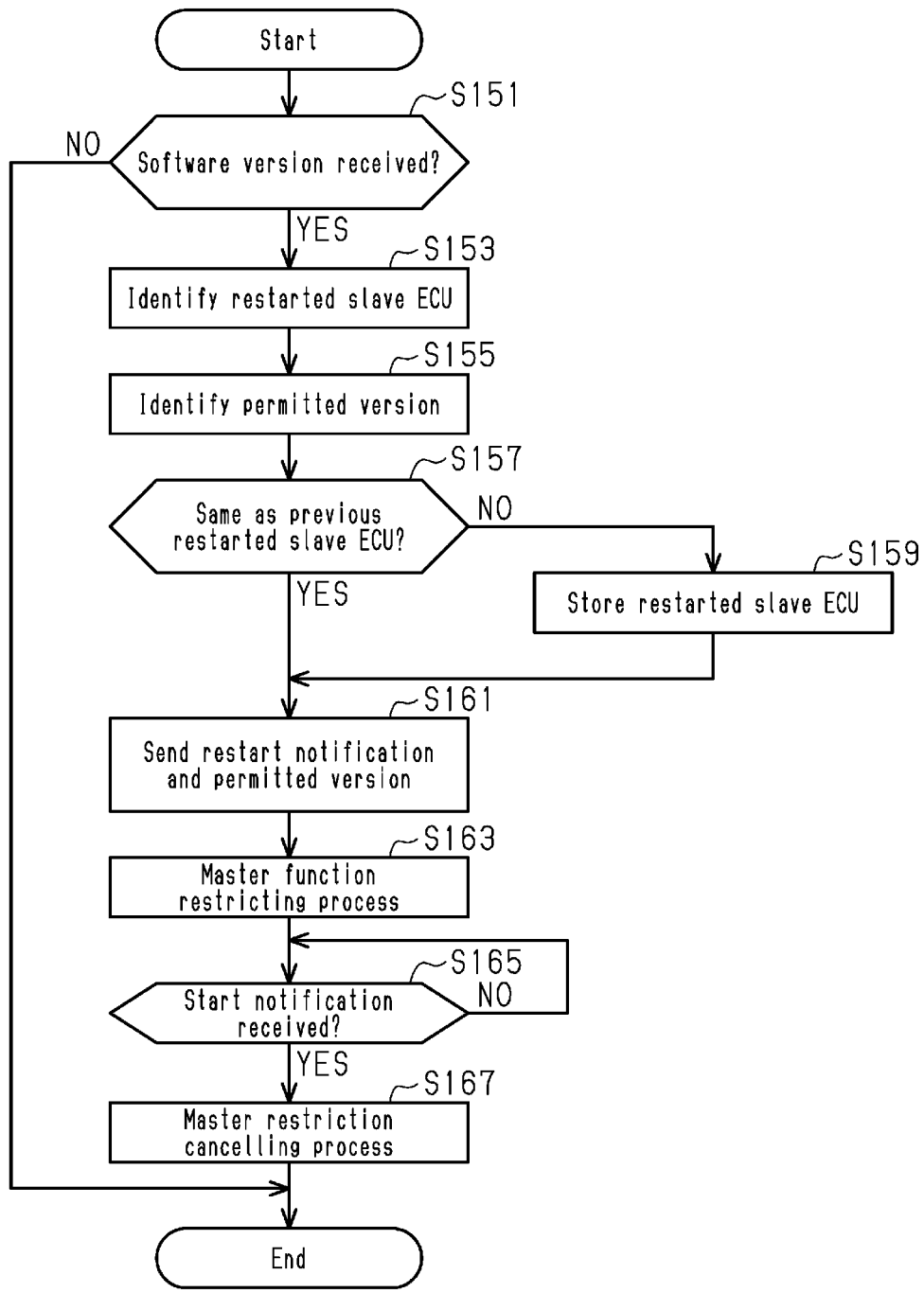
FIG. 11 is a flowchart illustrating a processing routine executed by the master ECU of the vehicle control system shown in FIG. 10, which is changed from FIG. 6.
Figure 12:
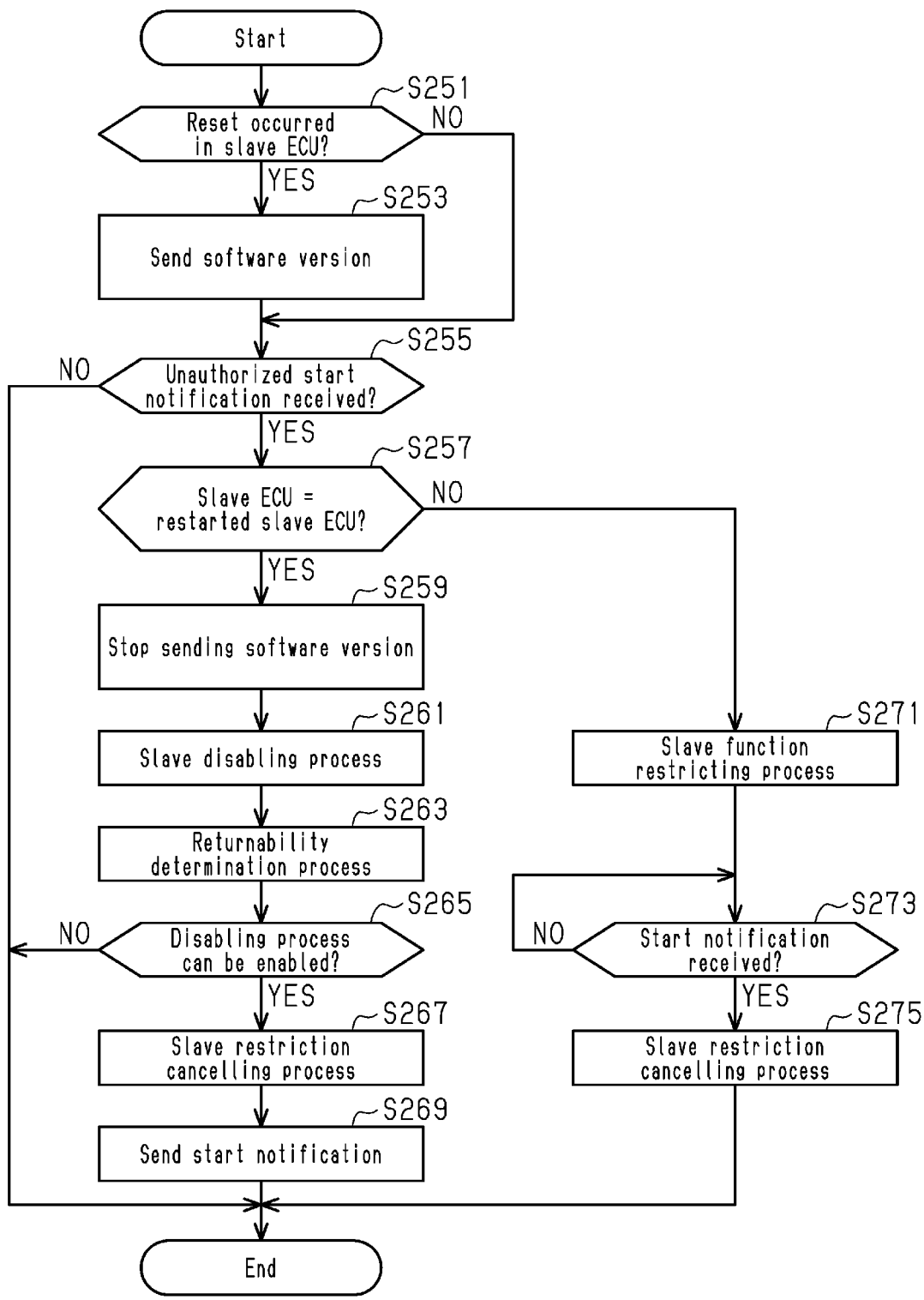
FIG. 12 is a flowchart illustrating a processing routine executed by the slave ECUs of the vehicle control system shown in FIG. 10, which is changed from FIG. 9.

A second embodiment will now be described with reference to FIGS. 10 to 12. The second embodiment is different from the first embodiment in part of the processing content that is executed after an ECU is restarted during the operation of the vehicle control system. The differences from the first embodiment will mainly be described below. Like or the same reference numerals are given to those components that are the same as the corresponding components of the first embodiment. Such components will not be described.

Vehicle Control Method

Regarding the flow of processes that reset the first slave ECU 301 and then restart the first slave ECU 301 during the operation of the vehicle control system 13, the difference from the first embodiment will be mainly described with reference to FIG. 10. To facilitate understanding, the vehicle control system 13 includes two slave ECUs; namely, the first slave ECU 301 and the second slave ECU 302.

The flow of processes (steps S11 to S25) from when the vehicle control system 13 starts to when execution of the software is started in the ECUs 20, 301, 302 is the same as that in the first embodiment.

When the first slave ECU 301 is reset during the operation of the vehicle control system 13, the first slave ECU 301 is restarted. Then, the first slave ECU 301 periodically sends, to the master ECU 20, information indicating the version of the first slave software that is the latest version stored in the first slave ECU 301 (step S27).

When receiving the information indicating the version of the first slave software from one of the first and second slave ECUs 301, 302, the master ECU 20 identifies the first slave ECU 301 that has sent the information as a restarted slave ECU (step S29A). Further, the master ECU 20 identifies a permitted version that is a version of the first slave software executed by the first slave ECU 301. Specifically, the master ECU 20 refers to the matching information shown in FIG. 2 to select, as the permitted version, the version of the first slave software for the first slave ECU 301 that matches the version of the first master software executed by the master ECU 20. The master ECU 20 sends the unauthorized start notification, which indicates that the first slave ECU 301 is the restarted slave ECU, to each of the first and second slave ECUs 301, 302. In addition, the master ECU 20 sends information indicating the permitted version to the first slave ECU 301, which is the restarted slave ECU.

When receiving the unauthorized start notification, the first slave ECU 301 stops sending the information indicating the version (step S31). Then, the first slave ECU 301 disables the execution of the first slave software therein (step S33).

When receiving the unauthorized start notification, the second slave ECU 302 executes the first slave software stored therein to enable only some of the functions (step S35). Further, when sending the unauthorized start notification, the master ECU 20 executes the first master software stored therein so that only some of the functions can be enabled (step S37). The functions include a function that cannot be enabled because the execution of the first slave software is disabled in the first slave ECU 301. This function is referred to as a disabled function.

From multiple versions of the first slave software stored in the first slave ECU 301, the first slave ECU 301 selects the permitted version of the first slave software indicated by the information received together with the unauthorized start notification. Then, the first slave ECU 301 starts executing the selected version of the first slave software (step S39). In addition, the first slave ECU 301 sends a start notification, which is information indicating that execution of the first slave software has started, to each of the other ECUs 20, 302.

When receiving the start notification from the first slave ECU 301, the master ECU 20 and the second slave ECU 302 cancel the restriction so that the disabled function of the functions can be enabled (steps S41 and S43). That is, the master ECU 20 executes the first master software so that the disabled function can also be enabled. The second slave ECU 302 executes the first slave software stored therein so that the disabled function can also be enabled.

When sending the start notification, the first slave ECU 301 cancels the restriction so that the disabled function of the functions can be enabled (step S45). That is, the first slave ECU 301 executes the first slave software stored therein to enable the disabled function.

Processing Routines Executed by Master ECU

One of the processing routines executed by the master execution unit 21 upon completion of the processing routine of FIG. 5 will now be described with reference to FIG. 11. The master execution unit 21 repeatedly executes the processing routine in a predetermined control cycle.

In step S151 of the processing routine, in the same manner as step S111, the master ECU 20 determines whether information indicating the version of the first slave software has been received from one of the slave ECUs (301 to 303, . . . ). In a case in which the information has been received (S151: YES), the master execution unit 21 advances the process to step S153. In a case in which the information has not been received (S151: NO), the master execution unit 21 temporarily ends the processing routine.

In step S153, as described in step S29A, the master execution unit 21 identifies the slave ECU that has sent the information as the restarted slave ECU. The processing content of step S153 is the same as that of step S113 described above. Subsequently, in step S155, the master execution unit 21 identifies the permitted version as described in step S29A.

In step S157, the master execution unit 21 determines whether the slave ECU identified as the restarted slave ECU in step S153 is the same as the slave ECU that was previously identified as the restarted slave ECU. When determining that they are the same (S157: YES), the master execution unit 21 advances the process to step S161. When determining that they are not the same (S157: NO), the master execution unit 21 advances the process to step S159.

In step S159, the master execution unit 21 stores, in the second master storage device 25, the slave ECU identified as the restarted slave ECU. Then, the master execution unit 21 advances the process to step S161.

In step S161, the master execution unit 21 sends, to each of the slave ECUs (301 to 303, . . . ) as the unauthorized start notification, the information indicating that the slave ECU that has sent the information is the restarted slave ECU. The master execution unit 21 also sends information indicating the permitted version to the restarted slave ECU.

In step S163, as described in step S37, the master execution unit 21 executes the master function restricting process, which executes the first master software so that only some of the functions 61 to 64, . . . can be enabled.

In step S165, the master execution unit 21 determines whether the start notification has been received from the restarted slave ECU. In a case in which the information has been received (S165: YES), the master execution unit 21 advances the process to step S167. In a case in which the information has not been received (S165: NO), the master execution unit 21 repeatedly executes the determination of step S165 until the receipt of the information.

In step S167, the master execution unit 21 executes the master function restricting process, which executes the first master software to enable the disabled function, as described in step S41. Then, the master execution unit 21 temporarily ends the processing routine.

Processing Routine Executed by Slave ECUs

The processing routines executed by the slave execution unit 31 upon completion of the processing routine of FIG. 8 will now be described with reference to FIG. 12. The slave execution unit 31 repeatedly executes the processing routine in a predetermined control cycle.

In step S251 of this processing routine, in the same manner as step S221, the slave execution unit 31 determines whether a reset has occurred therein. In a case in which a reset has occurred therein (S251: YES), the slave execution unit 31 advances the process to step S253. In a case in which a reset has not occurred therein (S251: NO), the slave execution unit 31 advances the process to step S255.

In step S253, the slave execution unit 31 sends, to the master ECU 20, the information indicating the version of the first slave software that is the latest version stored in the slave execution unit 31. Then, the slave execution unit 31 advances the process to step S255.

In step S255, in the same manner as step S225, the slave execution unit 31 determines whether the slave execution unit 31 has received the unauthorized start notification from the master ECU 20. In a case in which the unauthorized start notification has been received (step S255: YES), the slave execution unit 31 advances the process to step S257. In a case in which the unauthorized start notification has not been received (step S255: NO), the slave execution unit 31 temporarily ends the processing routine.

In step S257, the slave execution unit 31 determines whether the slave ECU is the restarted slave ECU based on the unauthorized start notification, in the same manner as step S227. When determining that the slave ECU is the restarted slave ECU (S257: YES), the slave execution unit 31 advances the process to step S259. When determining that the slave ECU is not the restarted slave ECU (S257: YES), the slave execution unit 31 advances the process to step S271. That is, when another one of the slave ECUs other than the slave execution unit 31 is the restarted slave ECU, the slave execution unit 31 advances the process to step S271.

In step S259, the slave execution unit 31 stops sending the information indicating the version. In step S261, as described in step S33. the slave execution unit 31 executes a slave disabling process that disables the execution of the first slave software.

Subsequently, in step S263, the slave execution unit 31 executes a returnability determination process to determine whether the disabled function can be enabled. Specifically, the slave execution unit 31 determines whether the permitted version of the first slave software is stored in the first slave storage device 33 of the slave ECU including the slave execution unit 31. When the permitted version of the first slave software is stored in the first slave storage device 33, the disabled function can be enabled. When the permitted version of the first slave software is not stored in the first slave storage device 33, the disabled function is incapable of being enabled.

In step S265, when determining that the disabled function can be enabled (S265: YES), the slave execution unit 31 advances the process to step S267. When determining that the disabled function cannot be enabled (S265: NO), the slave execution unit 31 temporarily ends the processing routine.

In step S267, as described in step S39 above, the slave execution unit 31 executes a slave restriction cancelling process that starts executing the permitted version of the first slave software from the versions of the first slave software stored in its first slave storage device 33. Then, the slave execution unit 31 executes the first slave software so that the disabled function can be enabled for the vehicle 10. In the next step S269, the slave execution unit 31 sends the start notification to each of the master ECU 20 and the other slave ECUs. Then, the slave execution unit 31 temporarily ends the processing routine.

In step S271, as described in step S35, the slave execution unit 31 executes the slave function restricting process, which executes the first slave software so that only some of the functions 61 to 64, . . . can be enabled. The processing content of step S271 is the same as that of step S233.

In step S273, the slave execution unit 31 determines whether the start notification has been received from the restarted slave ECU. In a case in which the start notification has been received (S273: YES), the slave execution unit 31 advances the process to step S275. In a case in which the information has not been received (S273: NO), the slave execution unit 31 repeatedly executes the determination of step S273 until the receipt of the information. However, when a predetermined time elapses from when the process was advanced to step S273, the slave execution unit 31 determines that the start notification will not be sent from the restarted slave ECU, and temporarily ends the processing routine.

In step S275, as described in step S43, the slave execution unit 31 executes the slave function restricting process to execute the first slave software stored therein so that the disabled function is enabled. Then, the slave execution unit 31 temporarily ends the processing routine.

Operation and Advantages of Present Embodiment

In the operation of the present embodiment, the difference from the first embodiment will be mainly described.

When receiving the information indicating the version of the first slave software during the operation of the vehicle control system 13, the master ECU 20 identifies the slave ECU that has sent the information as the restarted slave ECU. Further, the master ECU 20 identifies the permitted version of the first slave software of the restarted slave ECU, based on the matching information corresponding to the version of the first master software executed by the master ECU 20. Then, the master ECU 20 sends the unauthorized start notification and the information indicating the permitted version to the restarted slave ECU. Further, the master ECU 20 sends the unauthorized start notification to the slave ECUs other than the restarted slave ECU.

When receiving the unauthorized start notification, the restarted slave ECU disables execution of the first slave software. The other slave ECUs execute the first slave software stored therein so that only some of the functions 61 to 64, . . . can be enabled. Similarly, the master ECU 20 executes the first master software so that only some of the functions 61 to 64, . . . can be enabled. Some of the functions can be enabled even if the first slave software is not executed in the restarted slave ECU. The function whose execution is disabled is referred to as the disabled function.

In the present embodiment, the restarted slave ECU receives the information indicating the permitted version. Thus, while the first slave software is not being executed, the restarted slave ECU determines whether the restarted slave ECU is storing the permitted version of the first slave software. When the restarted slave ECU is storing the permitted version of the first slave software, the restarted slave ECU starts executing the permitted version of the first slave software. The restarted slave ECU executes the first slave software to enable the disabled function. Further, the restarted slave ECU sends the start notification to each of the other slave ECUs and the master ECU 20.

When receiving the start notification, the other slave ECUs execute the first slave software stored therein so that the disabled function can also be enabled. Similarly, when receiving the start notification, the master ECU 20 executes the first master software so that the disabled function can also be enabled. This allows the vehicle control system 13 to enable the disabled function of the vehicle 10.

A third embodiment will now be described with reference to FIG. 13. The third embodiment is different from the above embodiments in that a master device is located in a data center. Differences from the above embodiments will mainly be described below. Like or the same reference numerals are given to those components that are the same as the corresponding components of the above embodiments. Such components will not be described.

Figure 13:
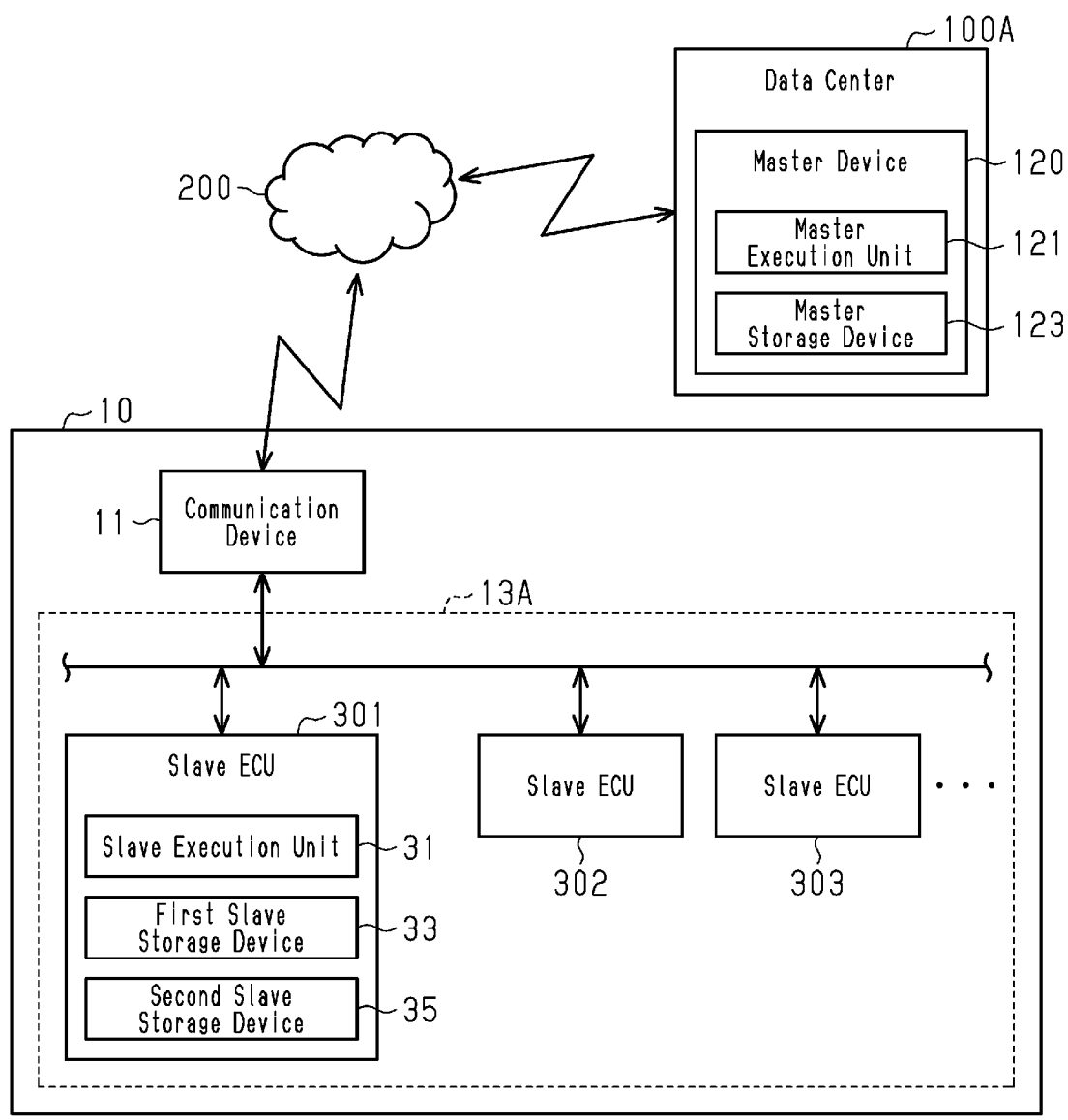
FIG. 13 is a diagram illustrating a schematic configuration of a vehicle including a vehicle control system and a schematic configuration of a data center configured to communicate with the vehicle, which are changed from FIG. 1.

As shown in FIG. 13, a vehicle control system 13A includes the slave ECUs (301 to 303, . . . ). In the vehicle control system 13A, the slave ECUs (301 to 303, . . . ) each execute the first slave software, thereby enabling the functions 61 to 64, . . . for the vehicle 10.

A data center 100A is configured to communicate with the vehicle 10 via the global network 200. The data center 100A includes a master device 120. The master device 120 is an electronic control unit including a master execution unit 121 and a master storage device 123. For example, the master execution unit 121 is a CPU and is master execution circuitry. The master storage device 123 stores control programs that are executed by the master execution unit 121.

Vehicle Control Method

The flow of processes that reset the first slave ECU 301 of the slave ECUs and then restart the first slave ECU 301 during the operation of the vehicle control system 13A will now be described. To facilitate understanding, the vehicle control system 13A includes two slave ECUs; namely, the first slave ECU 301 and the second slave ECU 302.

In the present embodiment, the master device 120 executes processes that are similar to those of the master ECU 20 in the above embodiments. When the operation switch of the vehicle 10 is operated to start the vehicle control system 13A, the first and second slave ECUs 301, 302 send, to the communication device 11, information indicating the version of the first slave software that is the latest version stored therein. The communication device 11 sends, to the data center 100A, the information indicating the version received from the first and second slave ECUs 301, 302.

In the data center 100A, the master device 120 performs the version check described in step S15. Then, the master device 120 sends the start command corresponding to the result of the version check to the vehicle 10 via the global network 200.

Then, the communication device 11 sends the start command to each of the first and second slave ECUs 301, 302. When receiving the start command, each of the first and second slave ECUs 301, 302 stops sending the information indicating the version. Then, as described in steps S21 and S23, each of the first and second slave ECUs 301, 302 starts executing the slave software stored therein.

When the first slave ECU 301 is reset during the operation of the vehicle control system 13A in this manner, the first slave ECU 301 is restarted. Then, the first slave ECU 301 sends information indicating the latest version of the first slave software stored therein to the data center 100A via the communication device 11.

When receiving the information indicating the version only from the first slave ECU 301 of the first and second slave ECUs 301, 302, the master device 120 identifies the first slave ECU 301 as the restarted slave ECU. Then, the master ECU 20 sends the unauthorized start notification, which indicates that the first slave ECU 301 is the restarted slave ECU, to each of the first and second slave ECUs 301, 302 via the communication device 11. The flow of the subsequent processes is the same as that in each of the above embodiments, and thus will not be described.

Modifications

The above embodiments may be modified as follows. The above embodiments and the following modifications can be combined as long as the combined modifications remain technically consistent with each other.

If the master ECU 20 and the master device 120 each store the combination table 55 as illustrated in FIG. 3, the slave ECUs (301 to 303, . . . ) do not have to store the combination table 55. In this case, the master ECU 20 and the master device 120 send information indicating the disabled function of the functions 61 to 64, . . . to the slave ECUs (301 to 303, . . . ) when sending the unauthorized start notification.

When the master ECU 20 is restarted during the operation of the vehicle control system 13, the master ECU 20 disables execution of the first master software and sends information indicating a master disabled function of the functions 61 to 64, . . . to the slave ECUs (301 to 303, . . . ). The master disabled function can be enabled even if the execution of the first master software is disabled in the master ECU 20. In this case, in each of the slave ECUs (301 to 303, . . . ), when the information is received, the first slave software stored in the slave ECU is executed so that a function other than the master disabled function can be enabled. As a result, even if the version of the software executed by the master ECU 20 and the version of the software executed by the slave ECUs (301 to 303, . . . ) do not match each other, some of the functions can be enabled for the vehicle 10.

Figure 14:
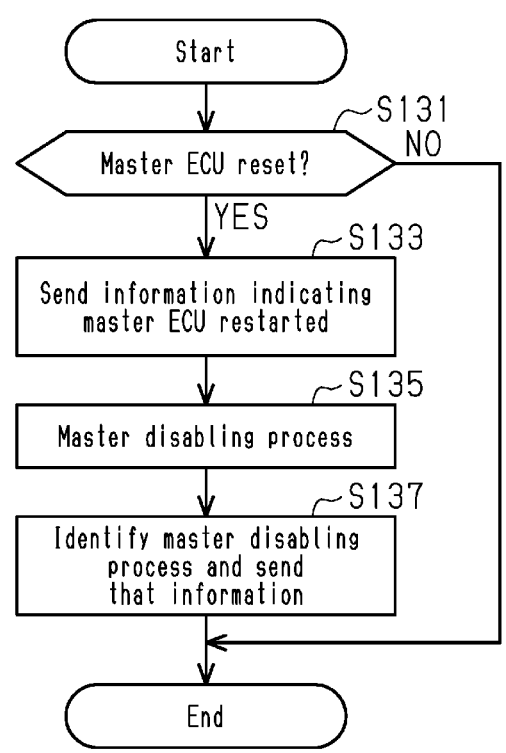
FIG. 14 is a flowchart illustrating a processing routine executed by the master ECU of a vehicle control system according to a modification, which is changed from FIG. 7.

FIG. 14 is a processing routine executed by the master execution unit 21 of the master ECU 20 during the operation of the vehicle control system 13. In this processing routine, when determining that the master execution unit 21 is reset (S131: YES), the master execution unit 21 advances the process to step S133. The master execution unit 21 sends information indicating that the master ECU 20 is restarted to the slave ECUs (301 to 303, . . . ) in step S133 and then executes the master disabling process in step S135. Subsequently, in step S137, the master execution unit 21 identifies the master disabled function using the combination table 55 of FIG. 3 and sends information indicating the master disabled function to each of the slave ECUs (301 to 303, . . . ). Then, the master execution unit 21 temporarily ends the processing routine.

In the first embodiment, the first slave software stored in the slave ECUs (301 to 303, . . . ) may include only one version of software.

In the first embodiment, the slave ECUs (301 to 303, . . . ) do not have to send information indicating the version of the first slave software to the master ECU 20 when they are started. In this case, when the slave ECUs (301 to 303, . . . ) are restarted during the operation of the vehicle control system 13, the slave ECUs each send information indicating that the slave ECU is restarted to another ECU and then disables execution of the first slave software. Further, when the other ECU receives the information during the operation of the vehicle control system 13, the other ECU can identify which one of the slave ECUs (301 to 303, . . . ) is the restarted slave ECU based on the information. Each of the slave ECUs other than the restarted slave ECU executes the first slave software stored in the slave ECU to enable a function other than the disabled function of the functions. In addition, the master ECU executes the first master software to enable a function other than the disabled function of the functions.

The master ECU and the slave ECUs are not limited to those that include a CPU and a ROM and execute software processing. That is, the master ECU and/or the slave ECUs may have any one of the following configurations (a) The ECU includes one or more processors that execute various processes in accordance with a computer program. The processor includes a CPU and a memory, such as a RAM and ROM. The memory stores program codes or instructions configured to cause the CPU to execute the processes. The memory, or a computer-readable medium, includes any type of medium that is accessible by general-purpose computers and dedicated computers.

(b) The ECU includes one or more dedicated hardware circuits that execute various processes. Examples of the dedicated hardware circuits include an application specific integrated circuit (ASIC) and a field programmable gate array (FPGA).

(c) The ECU includes a processor that executes part of various processes in accordance with a computer program and a dedicated hardware circuit that executes the remaining processes.

The phrase "at least one of" as used in this description means "one or more" of a desired choice. For example, the phrase "at least one of" as used in this description means "only one choice" or "both of two choices" in a case in which the number of choices is two. In another example, the phrase "at least one of" as used in this description means "only one single choice" or "any combination of two or more choices" if the number of its choices is three or more.

In this specification, "at least one of A and B" should be understood to mean "only A, only B, or both A and B."

The invention claimed is:

1. An electronic control unit (ECU), the ECU being one of a plurality of ECUs that are configured to provide a vehicle control system that enables functions of a vehicle, the ECU comprising:

storage circuitry that stores a plurality of versions of software, wherein one of the functions that is incapable of being enabled when the execution of the software is disabled in the ECU is referred to as a disabled function; and execution circuitry that executes the software stored in the storage circuitry, wherein the ECU is disposed in the vehicle and is configured to communicate with a master device that is also disposed in the vehicle, and wherein the execution circuitry is configured to execute:

a disabling process that disables execution of the software when the ECU including the execution circuitry is restarted during operation of the vehicle control system; and a restriction cancelling process that, when receiving information indicating a permitted version from the master device in a situation in which the execution of the software is disabled by executing the disabling process, allows the disabled function to be enabled by executing the permitted version of the software from the plurality of versions of the software stored in the storage circuitry, wherein the permitted version is a version of the software that is permitted to be executed in the situation in which the execution of the software is disabled by executing the disabling process.

2. A vehicle control system, comprising:

a master device disposed in a vehicle; and slave electronic control units (ECUs) that are also disposed in the vehicle, wherein the vehicle control system is configured to enable functions of the vehicle, the slave ECUs include:

slave storage circuitry that stores software that enables the functions of the vehicle; and slave execution circuitry that executes the software stored in the slave storage circuitry; the slave execution circuitry is configured to execute:

a disabling process that disables execution of the software stored in the slave storage circuitry when the slave execution circuitry is restarted during operation of the vehicle control system; and a function restricting process that executes the software stored in the slave storage circuitry to enable one of the functions that is capable of being enabled when execution of the software in another slave ECU is disabled in a case in which the other slave ECU is restarted during the operation of the vehicle control system, the slave ECUs are configured to communicate with the master device, the slave execution circuitry is configured to execute:

a version sending process that sends, when the slave ECU including the slave execution circuitry is started, information indicating a version of the software executed by the slave execution circuitry to the master device;

the disabling process when receiving, from the master device, information indicating that the slave ECU including the slave execution circuitry is restarted during the operation of the vehicle control system after executing the version sending process; and the function restricting process when receiving the information indicating that the other slave ECU was restarted during the operation of the vehicle control system, the master device includes master execution circuitry, one of the slave ECUs that was restarted during the operation of the vehicle control system is a restarted slave ECU, the master execution circuitry is configured to send an unauthorized start notification to each of the slave ECUs when receiving information indicating a version of the software from one of the slave ECUs during the operation of the vehicle control system, and the unauthorized start notification is information indicating that the one of the slave ECUs that has sent the information indicating the version is the restarted slave ECU.

3. The vehicle control system according to claim 2, wherein the master device includes:

Master storage circuitry that stores software that enables functions of the vehicle; and Master execution circuitry that executes the software, wherein the master device is an ECU configured to communicate with the slave ECUs, the master execution circuitry is configured to disable execution of the software and send information indicating that a master disabled function to each of the slave ECUs when determining that the master execution circuitry is restarted during the operation of the vehicle control system the master disabled function is one of the functions that is capable of being enabled when the execution of the software is disabled the slave execution circuitry is configured to execute a master function restricting process in response to receiving information indicating the master disabled function.

4. A vehicle control method, comprising:

providing a master device disposed in a vehicle;

providing slave electronic control units (ECUs) that are also disposed in the vehicle, wherein the slave ECUs are capable of sending and receiving information to and from the master device, the master device and the slave ECUs are configured to enable functions of the vehicle, and each of the slave ECUs includes storage circuitry that stores software that enables the functions of the vehicle;

causing the slave ECU to send information indicating a version of the software stored in the storage circuitry of the slave ECU to the master device when the slave ECU is started;

causing the master device to send an unauthorized start notification to each of the slave ECUs when the master device receives information indicating the version of the software from one of the slave ECUs during operation of the vehicle, wherein the unauthorized start notification is information indicating that the slave ECU that has sent the information indicating the version is a restarted slave ECU, and the restarted slave ECU is one of the slave ECUs that was restarted during the operation of the vehicle including the slave ECUs;

causing the restarted slave ECU to disable execution of the software stored in the storage circuitry of the restarted slave ECU; and causing another one of the slave ECUs other than the restarted slave ECU to execute the software stored in the storage circuitry of the other one of the slave ECUs to enable one of the functions that is capable of being enabled when the execution of the software is disabled in the restarted slave ECU.

5. A vehicle control method, comprising:

providing a master device disposed in a vehicle;

providing a plurality of electronic control units (ECUs) that are also disposed in the vehicle, each ECU including storage circuitry that stores a plurality of versions of software, and execution circuitry that executes the software stored in the storage circuitry, and wherein the ECUs are capable of communicating with the master device;

causing one of the ECUs to execute a disabling process that disables execution of the software stored in the storage circuitry when the ECU is restarted during operation of the vehicle;

causing the master device to transmit information indicating a permitted version of the software to the ECU that executed the disabling process; and causing the ECU to execute a restriction cancelling process that allows a disabled function to be enabled by executing the permitted version of the software from the plurality of versions of the software stored in the storage circuitry, wherein the permitted version is a version of the software that is permitted to be executed in a situation in which the execution of the software is disabled.

* * * * *